United States Patent
Matsuhira

(10) Patent No.: US 9,413,657 B2
(45) Date of Patent: Aug. 9, 2016

(54) COMMUNICATION DEVICE HAVING VPN ACCOMMODATION FUNCTION

(71) Applicant: FUJITSU LIMITED, Kawasaki-shi, Kanagawa (JP)

(72) Inventor: Naoki Matsuhira, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 13/921,754

(22) Filed: Jun. 19, 2013

(65) Prior Publication Data
US 2014/0003437 A1    Jan. 2, 2014

Related U.S. Application Data

(60) Division of application No. 12/777,313, filed on May 11, 2010, now Pat. No. 8,489,767, which is a division of application No. 10/319,930, filed on Dec. 12, 2002, now Pat. No. 8,423,669, which is a continuation of application No. PCT/JP00/03980, filed on Jun. 16, 2000.

(51) Int. Cl.
*H04L 12/46* (2006.01)
*H04L 12/56* (2006.01)
(Continued)

(52) U.S. Cl.
CPC .......... *H04L 45/741* (2013.01); *H04L 12/4604* (2013.01); *H04L 12/4633* (2013.01); *H04L 12/4666* (2013.01); *H04L 29/12358* (2013.01); *H04L 29/12424* (2013.01); *H04L 29/12801* (2013.01); *H04L 45/00* (2013.01); *H04L 45/50* (2013.01); *H04L 61/251* (2013.01);
(Continued)

(58) Field of Classification Search
None
See application file for complete search history.

(56) References Cited

U.S. PATENT DOCUMENTS

| 5,001,702 A | 3/1991 | Teraslinna et al. |
| 5,742,604 A | 4/1998 | Edsall et al. |

(Continued)

FOREIGN PATENT DOCUMENTS

| DE | 198 09 824 | 9/1998 |
| EP | 0840482 | 5/1998 |

(Continued)

OTHER PUBLICATIONS

United States Office Action dated Feb. 2, 2006, from corresponding U.S. Appl. No. 10/319,930.
(Continued)

*Primary Examiner* — Kodzovi Acolatse
(74) *Attorney, Agent, or Firm* — Katten Muchin Rosenman LLP

(57) ABSTRACT

Fully meshed virtual paths obtained with smaller number of settings, thus facilitating expansion of VPN service. A communication device in a virtual private network (VPN) having a VPN accommodation function for connecting an intra-organization network or inter-organization network through the Internet includes;
  a first means for generating a VPN address, a format of which includes both a VPN number for uniquely identifying a VPN in a certain scope and a closed address used in an organization or among organizations, either converting a packet header into a header having the above-mentioned VPN address or adding the above-mentioned VPN address to a packet header for transmission; and
  a second means for on receiving the packet having a header of the VPN address format, either converting the received packet into a packet format equivalent to an original packet format or removing a header having VPN address format.

2 Claims, 12 Drawing Sheets

(51) Int. Cl.
  *H04L 29/12* (2006.01)
  *H04L 12/701* (2013.01)
  *H04L 12/723* (2013.01)
  *H04L 29/06* (2006.01)

(52) U.S. Cl.
  CPC ........ *H04L61/2535* (2013.01); *H04L 61/6004* (2013.01); *H04L 69/16* (2013.01); *H04L 69/161* (2013.01); *H04L 69/167* (2013.01)

(56) References Cited

U.S. PATENT DOCUMENTS

| | | | |
|---|---|---|---|
| 6,038,233 | A | 3/2000 | Hamamoto et al. |
| 6,118,784 | A * | 9/2000 | Tsuchiya et al. ............. 370/401 |
| 6,339,595 | B1 * | 1/2002 | Rekhter ............. H04L 12/4645 370/392 |
| 6,353,614 | B1 | 3/2002 | Borella et al. |
| 6,438,127 | B1 * | 8/2002 | Le Goff et al. ................ 370/389 |
| 6,463,061 | B1 | 10/2002 | Rekhter et al. |
| 6,535,481 | B1 | 3/2003 | Andersson et al. |
| 6,594,704 | B1 | 7/2003 | Birenback et al. |
| 6,633,571 | B1 | 10/2003 | Sakamoto et al. |
| 6,701,437 | B1 | 3/2004 | Hoke et al. |
| 7,095,740 | B1 | 8/2006 | Jagannath et al. |
| 7,139,818 | B1 | 11/2006 | Kinnear, Jr. et al. |
| 7,574,738 | B2 | 8/2009 | Daude et al. |
| 2001/0016914 | A1 | 8/2001 | Tabata |
| 2001/0040895 | A1 | 11/2001 | Templin |
| 2001/0044842 | A1 | 11/2001 | Kawakami |
| 2001/0050914 | A1 | 12/2001 | Akahane et al. |
| 2002/0181477 | A1 | 12/2002 | Mo et al. |
| 2004/0093492 | A1 | 5/2004 | Daude et al. |

FOREIGN PATENT DOCUMENTS

| | | |
|---|---|---|
| EP | 0 952 755 | 10/1999 |
| JP | 11-355272 | 12/1999 |
| JP | 2000-106572 | 4/2000 |
| JP | 2000-138710 | 5/2000 |
| WO | 98/57465 | 12/1998 |

OTHER PUBLICATIONS

United States Office Action dated Jul. 20, 2006, from corresponding U.S. Appl. No. 10/319,930.
United States Office Action dated Jul. 19, 2007, from corresponding U.S. Appl. No. 10/319,930.
United States Office Action dated Jan. 17, 2008, from corresponding U.S. Appl. No. 10/319,930.
United States Office Action dated Jul. 29, 2008, from corresponding U.S. Appl. No. 10/319,930.
United States Office Action dated Feb. 13, 2009, from corresponding U.S. Appl. No. 10/319,930.
United State Office Action dated Nov. 3, 2009, from corresponding U.S. Appl. No. 10/319,930.
R. Hinden, et al. "An IPv6 Aggregatable Global Unicast Address Format" Network Working Group, Request for Comments: 2374, Jul. 1998. Cited in the United States Office Actions dated Jul. 20, 2006 and Feb. 2, 2006, from corresponding U.S. Appl. No. 10/319,930.
H. Afifi, et al. "Methods for IPv4-IPv6 Transition" Computers and Communications, IEEE, 1999. Cited in the United States Office Action dated Feb. 2, 2006, from corresponding U.S. Appl. No. 10/319,930.
Chuck Semeria et al. "RFC 2547bis: BGP/PLS VPN Fundamentals" 2001, Juniper Networks, Fig. 5 on p. 12. Cited in the United States Office Action dated Feb. 13, 2009, from the corresponding U.S. Appl. No. 10/319,930.
E. Rosen, et al. "BGP/MPLS VPNs" Network Working Group, Request for Comments: 2547, Mar. 1999. Cited in the United States Office Action dated Feb. 13, 2009, from corresponding U.S. Appl. No. 10/319,930.
United States Office Action dated May 7, 2012, from corresponding U.S. Appl. No. 10/319,930.
United States Office Action dated May 23, 2011, from corresponding U.S. Appl. No. 10/319,930.
European Communication pursuant to Article 94(3) EPC dated Dec. 21, 2010, from corresponding European Application No. 09 164 530 9.
European Communication pursuant to Article 94(3) EPC dated Dec. 21, 2010, from corresponding European Application No. 09 164 531.7.
European Search Report dated Dec. 20, 2010, from corresponding European Application No. 10 18 5985.
European Search Report dated Dec. 17, 2010, from corresponding European Application No. 10 18 5998.
European Search Report dated Dec. 17, 2010, from corresponding European Application No. 10 18 6013.
European Search Report dated Dec. 17, 2010, from corresponding European Application No. 10 18 6014.
G. Tsirtsis, et al. Network Address Translation—Protocol Translation (NAT-PT), Network Working Group, Request for Comments: 2766, Feb. 2000.
Steve King, et al. "The Case for IPv6" Internet Architecture Board, Oct. 22, 1999.
United States Office Action dated Dec. 8, 2010, from corresponding U.S. Appl. No. 10/319,930.
United States Office Action dated Oct. 14, 2011, from corresponding U.S. Appl. No. 10/319,930.
United States Office Action dated Jun. 30, 2010, from corresponding U.S. Appl. No. 10/319,930.
Supplementary European Search Report dated Jul. 1, 2003, from corresponding European Application No. 00 93 7295.
International Preliminary Examination Report dated Oct. 31, 2003, from corresponding International Application No. PCT/JP00/03980.
European Search Report dated Jul. 31, 2009, from corresponding European Application No. 09 16 4530.
European Search Report dated Jul. 31, 2009, from corresponding European Application No. 09 16 4531.
International Search Report dated Aug. 29, 2000, from corresponding International Application No. PCT/JP00/03980.
B. Gleeson, et al. "A Framework for IP Based Virtual Private Networks" Network Working Group, Request for Comments: 2764, The Internet Society, Feb. 2000. Cited in the International Preliminary Examination Report dated Oct. 31, 2003, from corresponding International Application No. PCT/JP00/03980 and the International Search Report dated Aug. 29, 2000, from corresponding International Application No. PCT/JP00/03980.
Robert M. Hinden, "IP Next Generation Overview" Communications of the Association for Computing Machinery, vol. 39, No. 6, Jun. 1, 1996, pp. 61-71. Cited in the Supplementary European Search Report dated Jul. 1, 2003, from corresponding European Application No. 00 93 7295 and also cited in both European Search Reports dated Jul. 31, 2009, from corresponding European Application No. 09 16 4530and 09 16 4531.
David C. Lee, et al. "The Next Generation of the Internet: Aspects of the Internet Protocol Version 6" IEEE Network, vol. 12, No. 1, 1998, pp. 28-33. Cited in the Supplementary European Search Report dated Jul. 1, 2003, from the corresponding European Application No. 00 93 7295 and also cited in both European Search Reports dated Jul. 31, 2009, from corresponding European Application No. 09 16 4530 and 09 16 4531.
Hiroshi Ezaki, et al. "Computer & Network LAN, IP-VPN: Corporate Network Strategy in the year 2000, IP-VPN is Really Going to Take Off" Information Technology Center, University of Tokyo, Sep. 1999, pp. 2-13, & 37-39, vol. 17, No. 9 Cited in the International Preliminary Examination Report dated Oct. 31, 2003, from corresponding International Application Number PCT/JP00/03980 and the International Search Report dated Aug. 29, 2000, from corresponding International Application Number PCT/JP00/03980.

(56) References Cited

OTHER PUBLICATIONS

Goerge Tsirtsis, et al. "Possible Mechanisms and Componenets for AATN; <draft-tsirtsis-aatn-mech-00.txt>" IETF Standard-Working Draft, Internet Engineering Task Force, Internet Draft, Apr. 1, 1998. Cited in both European Search Reports dated Jul. 31, 2009, from corresponding European Application No. 09 16 4530 and 09 16 4531.
United States Office Action dated Sep. 30, 2010, from corresponding U.S. Appl. No. 12/777,313.
United States Office Action dated May 12, 2011, from corresponding U.S. Appl. No. 12/777,313.
United States Office Action dated Oct. 21, 2011, from corresponding U.S. Appl. No. 12/777,313.
United States Office Action dated May 7, 2012, from corresponding U.S. Appl. No. 12/777,313.
United States Office Action dated Mar. 4, 2013, from corresponding U.S. Appl. No. 12/777,313.
"Computer & Networks LAN", Kabushiki Kkaisha OHMA-SHA Sep. 1999, pp. 2-13 & 37-39: vol. 17, No. 9. Cited in the International Preliminary Examination Report dated Oct. 31, 2003, from corresponding International Application No. PCT/JP00/03980.
European Search Report dated Mar. 9, 2015 from corresponding Application No. 14198863.4.

* cited by examiner

Label: Label Value, 20 bits
Exp: Experimental Use, 3 bits
S: Bottom of Stack, 1 bit TTL: Time to Live, 8 bits

IN CASE FIG. 5
(FIG. 10/FIG. 11)

IN CASE FIG. 4
(FIG. 13/FIG. 14)

Where

| | |
|---|---|
| FP | Format Prefix (001) |
| TLA ID | Top-Level Aggregation Identifier |
| RES | Reserved for future use |
| NLA ID | Next-Level Aggregation Identifier |
| SLA ID | Site-Level Aggregation Identifier |
| INTERFACE ID | Interface Identifier |

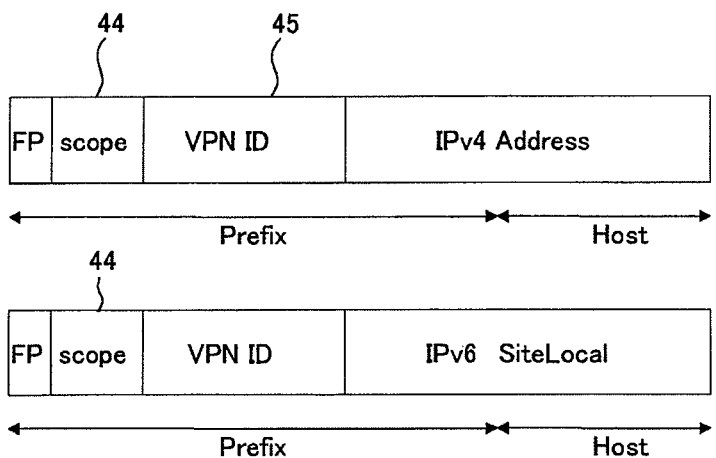
FIG. 19A
FIG. 19B
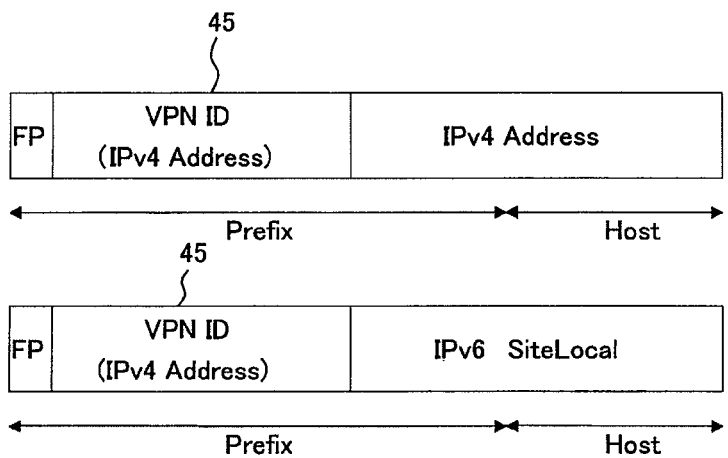
FIG. 20A
FIG. 20B

COMMUNICATION DEVICE HAVING VPN ACCOMMODATION FUNCTION

FIELD OF THE INVENTION

The present invention relates to a communication device having a VPN (virtual private network) accommodation function for use in the Internet.

BACKGROUND OF THE INVENTION

The Internet is a network enabling worldwide interconnection among users, the number of which is proliferating. In recent years, a variety of techniques have been developed actively to implement a VPN using the Internet.

The VPN, or virtual private network, is a service connecting intranets through the Internet. An example of a network configuration providing VPN is shown in FIG. 1. In this FIG. 1, a variety of network organizations including A-C are connected through routers 20-25 to a network 1 which is managed by a service provider. These routers are referred to as VPN edge routers.

Network 1 provided by the service provider generally interconnects with other networks provided by other service providers. As a VPN, a network for an organization A, as an example, is exclusively interconnected within this organization A only, separated from organizations B and C, through network 1 by the service provider. In other words, only each network inside organization A, B or C is logically interconnected.

Here, either a global address or a private address is used in an intranet whereas a global address is normally used in the Internet. The private address is an address to be applied in a network which is closed in the scope of an organization, and therefore an identical address may possibly be used in different organizations.

Accordingly, in an device accommodating VPN, it becomes necessary to provide the packet routing function for both Internet and intranet. Normally, in the direction from intranet to Internet, any packet for communication in an intranet is converted to a packet which can be processed in the Internet. In the direction from Internet to intranet, the packet format is converted in an opposite way to the above.

In the prior arts for performing such processing, as a first art, there is a method of either combining an IPv4 (Internet Protocol, version 4) header, the format of which includes a source address 26 and a destination address 27 shown in FIG. 2, with another IPv4 header, or combining with an IPv6 (Internet Protocol, version 6) header, the format of which includes a source address 28 and a destination address 29 shown in FIG. 3. Thus the headers are encapsulated as shown in FIGS. 4A and 4B, respectively (corresponding to the Internet standard recommendation document, RFC 1853). Further, as a second prior art, there is a method of employing an MPLS (MultiProtocol Label Switching) shim header shown in FIG. 5 to encapsulate both an IPv4 header and a shim header, as shown in FIG. 4C.

Both of the aforementioned prior arts employ a method of establishing a packet path on the boundary between the Internet and the intranet (which is referred to as tunnel).

More specifically, the encapsulation technique shown in FIG. 4 is realized by setting an IP address assigned at the boundary into an IP header for encapsulation.

Meanwhile, according to the encapsulation method by a shim header shown in FIG. 4C using a MPLS header shown in FIG. 5, the tunneling between both sides of the boundary is enabled by setting a unique value in a label field (Label) of the shim header on a link-by-link basis, and setting a virtual path by converting this value included in the label field in the device connecting the links.

However, according to the aforementioned prior arts, the number of settings in the device incorporating VPN becomes 'the number of tunnels×2 (i.e. both end points of the tunnels)'. Therefore, there is a problem that a substantially large number of settings become necessary as the number of sites increases.

The number of the tunnels among N sites is (N−1)×2 in the case of a star connection network in which the number of tunnels is minimized. The number becomes N×(N−1) in case of a full mesh connection. If one site is added, it is necessary to add to two (2) settings in the case of star connection, or N settings in case of the full mesh connection.

In case of the star connection, the performance of a root node may cause a bottleneck. In addition, because a communication between nodes other than root has to be transmitted through the root, an identical packet has to be transmitted twice in the Internet. This raises a problem of additional bandwidth consumption, so use of full mesh connection is desirable.

SUMMARY OF THE INVENTION

Accordingly, it is an object of the present invention to provide a VPN service with fully meshed virtual paths obtained with smaller number of settings, thus facilitating expansion of VPN service.

This object is attained by providing a communication device in a virtual private network (VPN) having a VPN accommodation function for connecting an intra-organization network or inter-organization network in accordance with the present invention through the Internet. As a first embodiment of the communication device according to the present invention, the communication device includes;

a first means for generating a VPN address, a format of which includes both a VPN number for uniquely identifying a VPN in a certain scope and a closed address used in an organization or among organizations, either converting a packet header into a header having the above-mentioned VPN address or adding the above-mentioned VPN address to a packet header for transmission; and a second means for on receiving the packet having a header of the VPN address format, either converting the received packet into a packet format equivalent to an original packet format or removing a header having VPN address format.

Further, as a second preferred embodiment according to the present invention, in the aforementioned first embodiment, the communication device further includes a processing means for on receiving a packet having the VPN address format, extracting a VPN number from the VPN address, comparing to a retained VPN number and discarding the packet when the comparison results in inconsistency.

Still further, as a third preferred embodiment, in the aforementioned first or second embodiment, a protocol used in an organization or among organizations is IPv4 (Internet Protocol, version 4), a packet having a VPN address format conforms to IPv6 (Internet Protocol, version 6), and an IPv6 header is either added to the IPv4 header or substituted for IPv4 header by the above-mentioned first means.

As a fourth preferred embodiment, in the aforementioned third embodiment, the VPN number is included in an NLA-ID (Next-Level Aggregation Identifier) field of the IPv6 aggregatable address format, and an IPv4 address is stored in an SLA-ID (Site-Level Aggregation Identifier) field and an Interface Identifier field.

Further, as a fifth preferred embodiment, in the aforementioned first or second embodiment, a protocol used in an organization or among organizations is IPv4, a packet having a VPN address format conforms to IPv6, and an IPv6 header is added to an IPv4 packet or deleted.

Still further, as a sixth preferred embodiment, in the aforementioned first or second embodiment, a protocol used in an organization or among organizations is IPv6, a packet having VPN address format conforms to IPv6, and a VPN address is generated using a VPN number and an SLA-ID (Site-Level Aggregation Identifier) field and an Interface Identifier field of the site-local address format or an aggregatable global address included in an address of an IP header used in an organization or among organizations, to perform address conversion.

Still further, as a seventh preferred embodiment, in the aforementioned first or second embodiment, VPN address in a VPN network for connecting an intra-organization network or an inter-organization network through the Internet is constituted of a Scope field indicating whether a VPN-ID is either a VPN which is closed inside an ISP or a VPN which is connected through a plurality of ISP, and a VPN number by which a VPN is uniquely identifiable in the Scope concerned.

Still further, as an eighth preferred embodiment, in either of the aforementioned embodiments, a VPN-ID is constituted of an IPv4 address as the VPN address.

Further scopes and features of the present invention will become more apparent by the following description of the embodiments with the accompanied drawings.

BRIEF DESCRIPTION OF THE DRAWINGS

FIG. 19A shows a case of a VPN address employing IPv4 in the intranet. FIG. 19B shows a case of a VPN address employing IPv6 in the Internet.

FIG. 20A shows a case of an IPv4 employed in the intranet. FIG. 20B shows a case of an IPv6 employed in the intranet.

DETAILED DESCRIPTION OF THE PREFERRED EMBODIMENTS

The preferred embodiment of the present invention is described hereinafter referring to the charts and drawings, wherein like numerals or symbols refer to like parts. It is to be noted that these charts and drawings illustrating the embodiments are attached for explaining the present invention. The scope of the protection in the present invention is not to be limited to these illustrations.

Figure 6A:
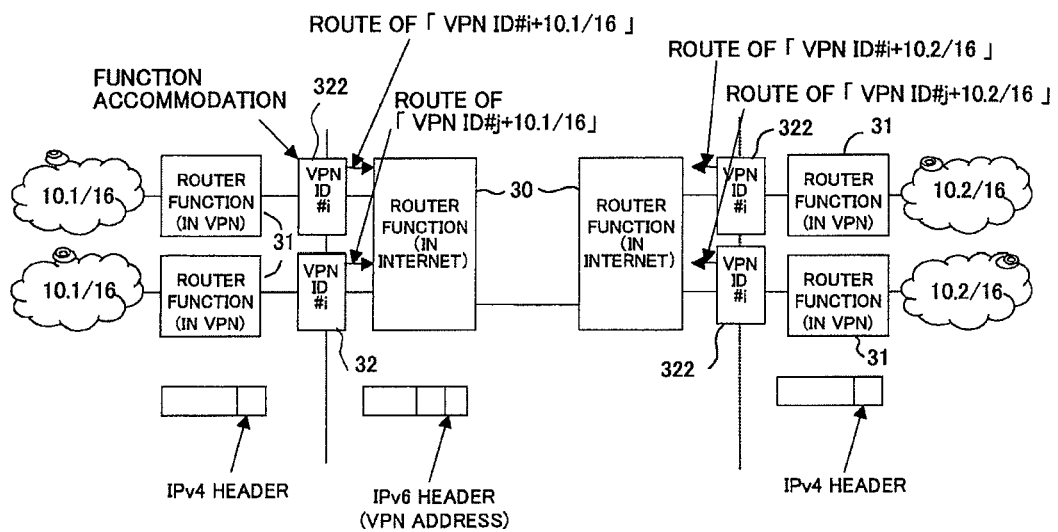
FIG. 6A shows a drawing illustrating the configuration concept of the present invention.

FIG. 6A is a drawing illustrating the configuration concept of the present invention. In FIG. 6A, a VPN accommodation function portion 32 according to the present invention is provided between an Internet router function portion 30 and a VPN router function portion 31.

This VPN accommodation function portion 32 has a function of either converting a header of a packet for transmission into a header having a VPN address format, or encapsulating by including a header of the VPN address format. VPN accommodation function portion 32 also has a function of converting a packet to an identical format of an original packet or deleting a header having the VPN address format on receiving a packet having the VPN address format.

Figure 7:
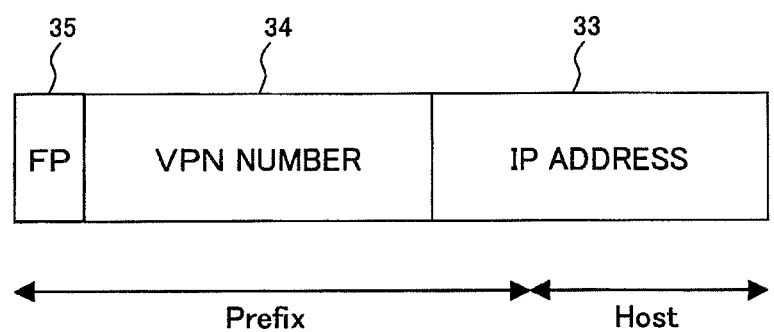
FIG. 7 shows a diagram illustrating the definition of VPN address.

In the description of the present invention, a VPN address format shown in FIG. 7 is defined. A header conforming to the address format is generated by adding an ID for identifying a VPN, i.e. a VPN number 34 to an IP address 33 for use in an intranet.

VPN number 34 is a number uniquely assigned in a certain region. This region may be the whole region of the Internet or a region of an Internet service provider (ISP). The address in the structure according to the present invention is distinguished from an address of other type by an FP (Format Prefix) 35.

According to the present invention, when compared to the case of a full mesh network producing better efficiency, the number of settings required for performing VPN can be reduced to N in contrast to N×(N−1) in the prior art. For the reference, the number required for a star connection in the prior art is (N−1)×2. Namely, according to the present invention, a full mesh network can be obtained with the number of settings smaller than in the case of star connection in the prior art.

Also, in the case of adding a site in a full mesh network, according to the present invention, only one setting is need, in contrast to N settings required in the prior art.

In regard to processing for performing normal routing in the Internet, path establishment on a link-by-link basis is necessary in the method employing MPLS shim header. In contrast, according to the present invention, it is only necessary for route switching to use an existing protocol like RIP (Routing Information Protocol) widely in use having abundant operational results, as well as OSPF (Open Shortest Path First), IS-IS (Intermediate System-Intermediate System) or BGP (Border gateway Protocol), which are modified so as to conform to the Internet protocol IPv6.

Therefore, such a protocol as employed in MPLS which requires to set label value is not needed. Here, by combining the technique of encapsulating an IPv6 packet with an IPv4 header, it becomes not necessary that all network device of service provider conform to IPv6.

Figure 8:
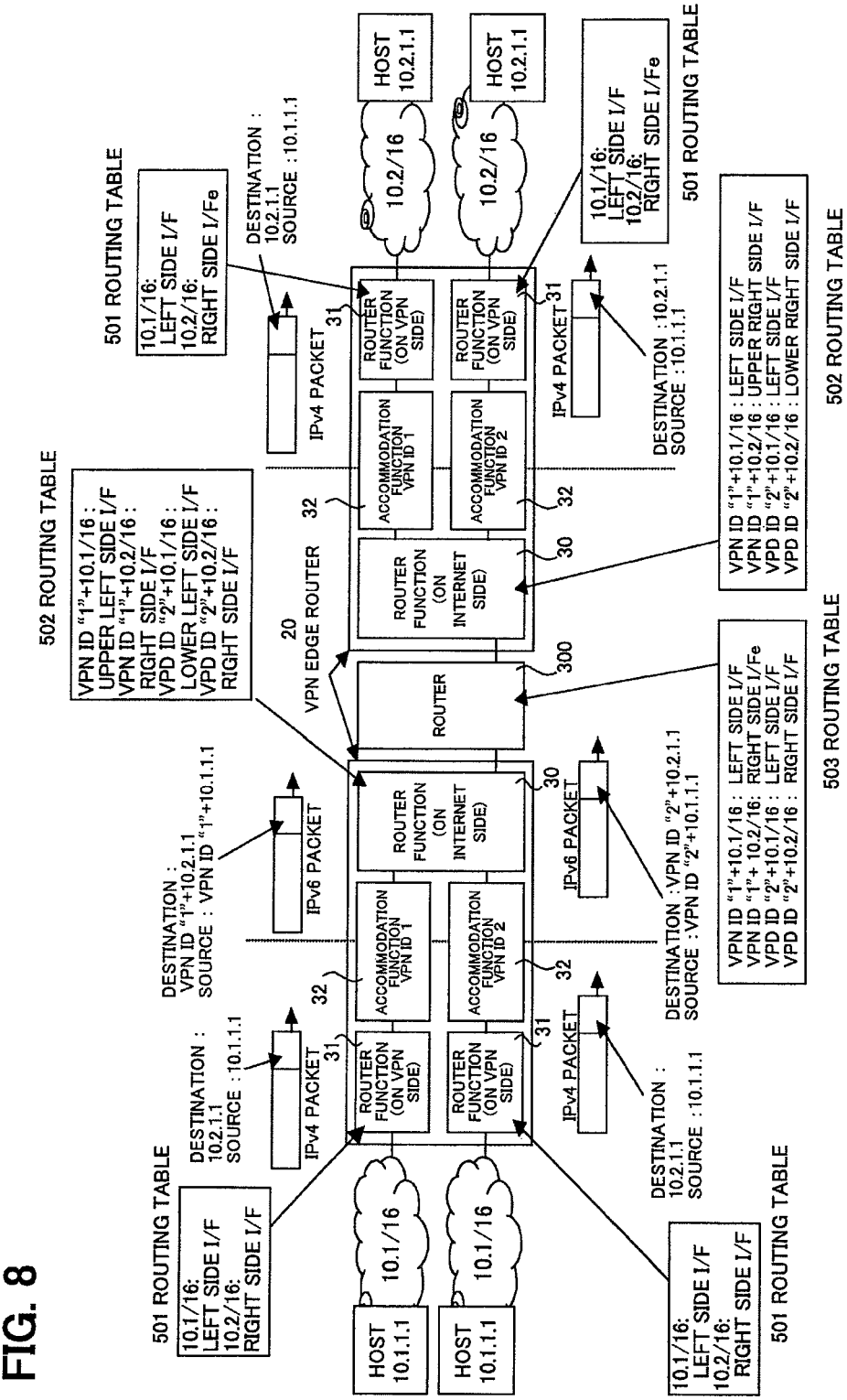
FIG. 8 shows a typical embodiment of the present invention.

Now, a typical embodiment of the present invention is described hereafter referring to the example shown in FIG. 8, in which an IPv4 address (either global address or private address) is used in the intranet, and an IPv6 address is used in the Internet.

In the example shown in this FIG. 8, a router function portion (on Internet side) 30, a router function portion (on VPN side) 31 and a VPN accommodation function portion 32 are provided as a VPN edge router 20. A router 300 is a router function portion for connecting between VPN edge routers 20.

VPN router function portion 31 has a routing table 501, while router function portion 30 and router 300 have routing tables 502 and 503, respectively. A destination address and a source address are described in an IPv4 packet header referring to these routing tables.

Figure 9:
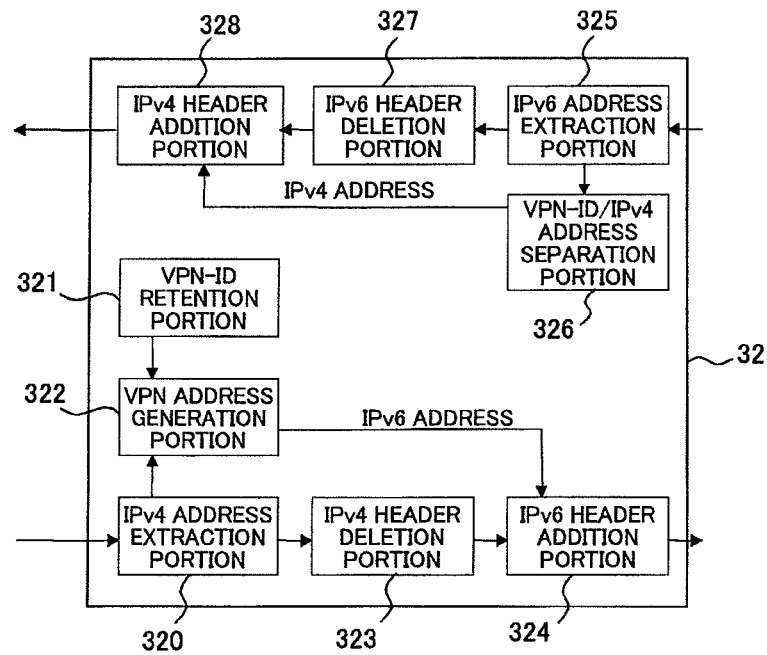
FIG. 9 shows an example of configuration of a VPN accommodation function portion shown in FIG. 8, illustrating an example of converting an IPv4 header into an IPv6 header.

FIG. 9 is a configuration block diagram of VPN accommodation function portion 32 according to the present invention.

When packet communication is carried out from one site in a VPN to another site in the VPN, an IPv4 packet for use in the originating site is transmitted to VPN accommodation function portion 32 in VPN edge router 20.

In VPN accommodation function portion 32, IP addresses (both source address and destination address) included in the IPv4 packet are extracted in an IPv4 address extraction portion 320.

Figure 11:
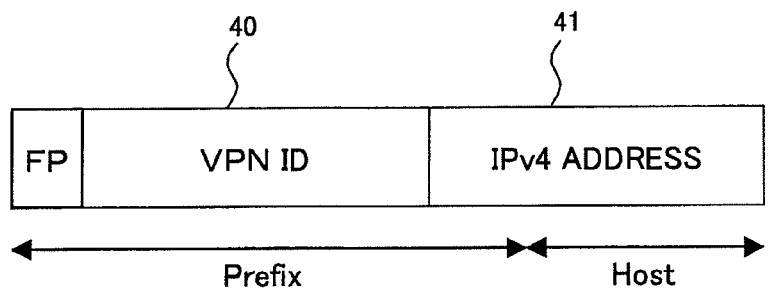
FIG. 11 shows a diagram illustrating an IPv6 address generated in the exemplary configurations shown in FIGS. 8, 9.

Using a VPN-ID (number) being set in a VPN-ID retention portion 321 in advance for identifying the VPN of interest, a VPN address in the form of IPv6 for the Internet is generated by combining a VPN-ID 40 with an IPv4 address 41 in a VPN address generation portion 322, as shown in FIG. 11.

The IPv6 VPN address thus generated is used for an IPv6 header address to be added in an IPv6 header addition portion 324 after an IPv4 header is deleted in an IPv4 header deletion portion 323, as shown in FIG. 9. Thus the IPv4 header is converted into an IPv6 header.

The IPv6 packet thus converted is transferred to VPN accommodation function portion 32 in VPN edge router 20 to which the destination site is connected through the Internet 1. This VPN accommodation function portion 32 is explained also referring to FIG. 9. In FIG. 9, an IPv6 packet is input to an IPv6 packet address extraction portion 325.

The IPv6 address extracted in IPv6 address extraction portion 325 is input to VPN-ID/IPv4 address separation portion 326 to separate the IPv4 address. The separated IPv4 address is then used as an address in the IPv4 header to be added in IPv4 header addition portion 328 to a packet of which IPv6 header is deleted in an IPv6 header deletion portion 327. Thus the packet concerned is returned to an IPv4 packet.

Figure 6B:
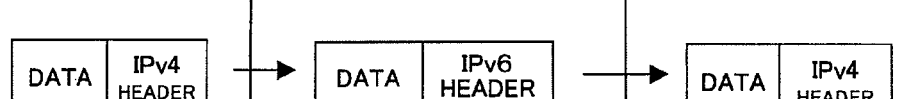
FIG. 6B shows an aspect of header conversion between intranet and the Internet.

FIG. 6B shows an aspect of header conversion between intranet and the Internet corresponding to the aforementioned description referring to FIG. 9.

Figure 10:
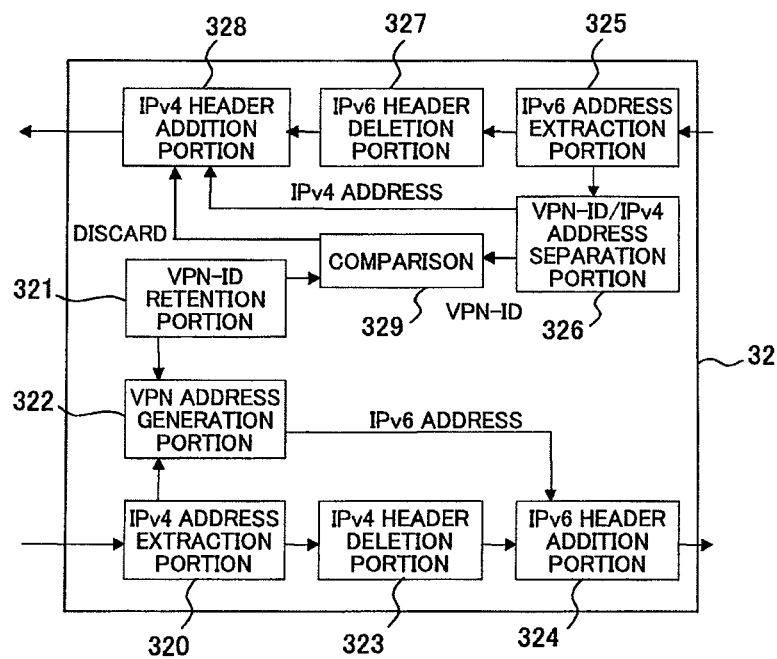
FIG. 10 shows another exemplary configuration of the VPN accommodation function portion shown in FIG. 8 in the example of converting an IPv4 header into an IPv6 header.

In the above description, it may also be possible to check whether the VPN-ID of the packet input to VPN accommodation function portion 32 coincides with a predetermined VPN-ID. In such a case, VPN accommodation function portion 32 is configured as shown in FIG. 10. Namely, a comparison circuit 329 is additionally provided compared to the configuration shown in FIG. 9.

Using this comparison circuit 329, a predetermined VPN number corresponding to the VPN of interest retained in VPN-ID retention portion 321 is compared to the VPN-ID separated in VPN-ID/IPv4 address separation portion 326.

As the result of this comparison, if the VPN numbers are different, the packet is discarded in an IPv4 header addition portion because the packet has no relation with the VPN of interest. This enables to prevent any packet from flowing in or flowing out from/to a different VPN, thus enabling to improve security.

Further, as a result of VPN accommodation function portion 32 outputting a route including up to an IPv4 prefix shown in FIG. 11, routing by IPv6 is carried out according to routing table 502 shown in FIG. 8.

In the above description, a case of converting an IPv4 header into an IPv6 header is shown. However, in place of this conversion processing, it is also possible to employ the aforementioned encapsulation method.

Figure 12:
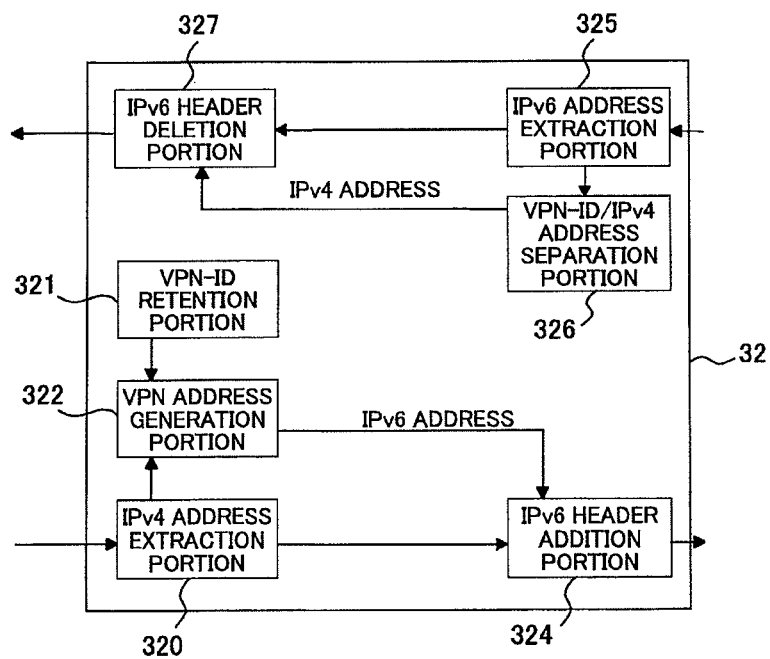
FIG. 12 shows an example of configuration of the VPN accommodation function portion shown in FIG. 8, illustrating an example of encapsulating an IPv4 packet with an IPv6 header.
Figure 13:
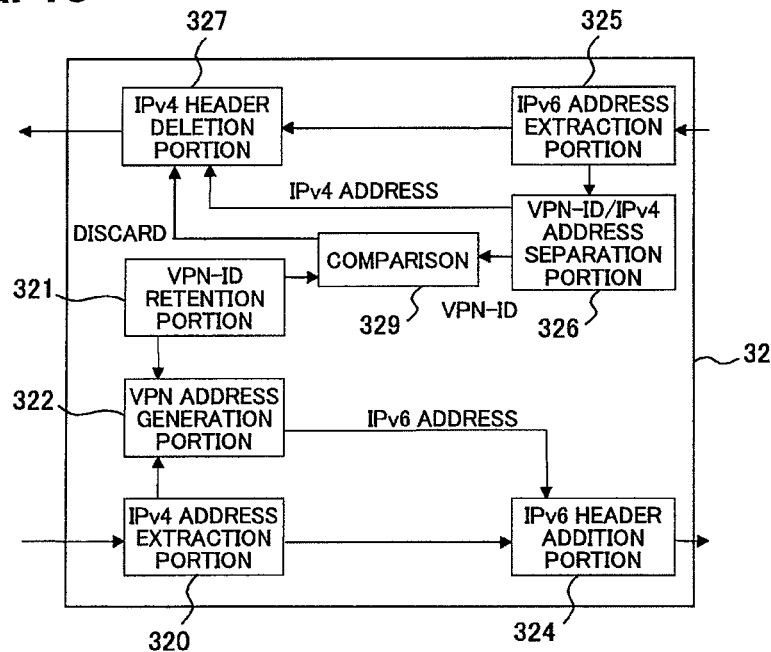
FIG. 13 shows another example of configuration of the VPN accommodation function portion shown in FIG. 8 in an example of encapsulating an IPv4 packet with an IPv6 header.

In such a case, the configurations of VPN accommodation function portion 32 shown in FIGS. 9, 10 are replaced by the configurations shown in FIGS. 12, 13, respectively. In the configurations shown in FIGS. 12, 13, IPv4 header deletion portion 323 and IPv4 header addition portion 328 become unnecessary.

Namely, an IPv6 VPN address generated in VPN address generation portion 322 is added to an IPv4 packet in IPv6 header addition portion 324 to encapsulate. Therefore, IPv4 header deletion portion 323 is not required in FIGS. 12, 13.

Also, in FIGS. 12, 13, the IPv6 address included in a signal input from the Internet is extracted in IPv6 address extraction portion 325, while the IPv4 address remains unchanged. Therefore, IPv4 address addition portion 328 is not required also.

Figure 1:
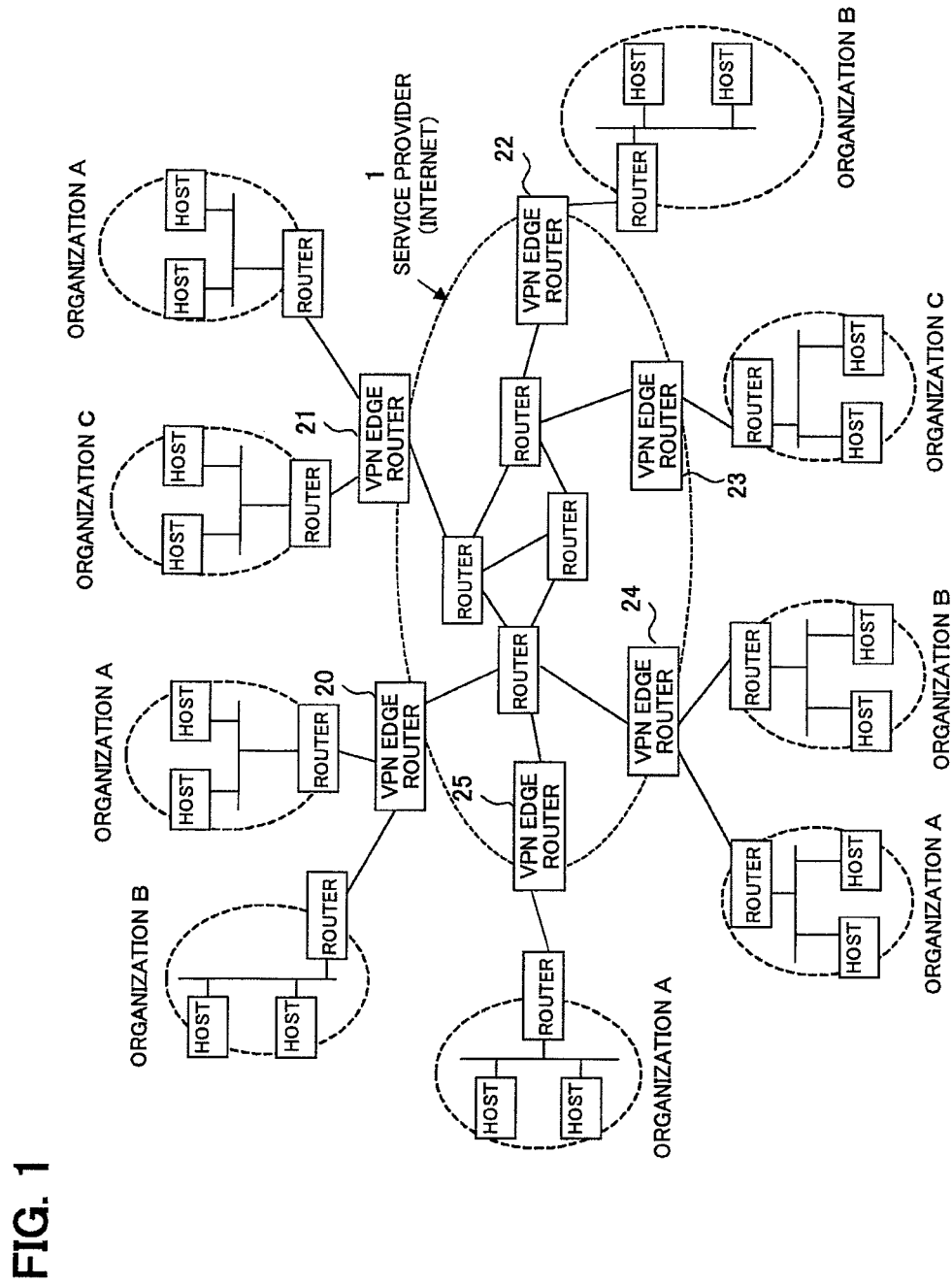
FIG. 1 shows an example of network configuration diagram constituting a virtual private network (VPN).
Figure 2:
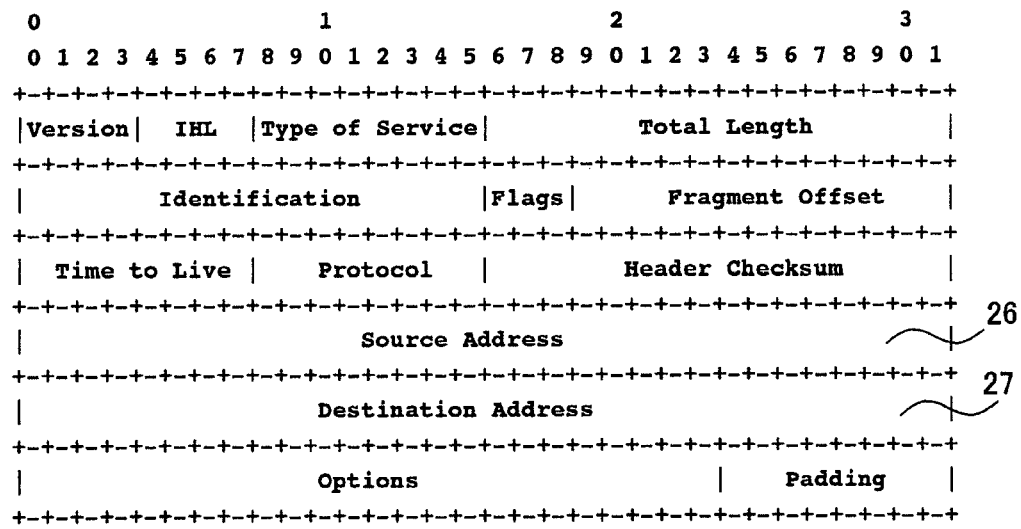
FIG. 2 shows an explanation drawing of an IPv4 header.
Figure 3:
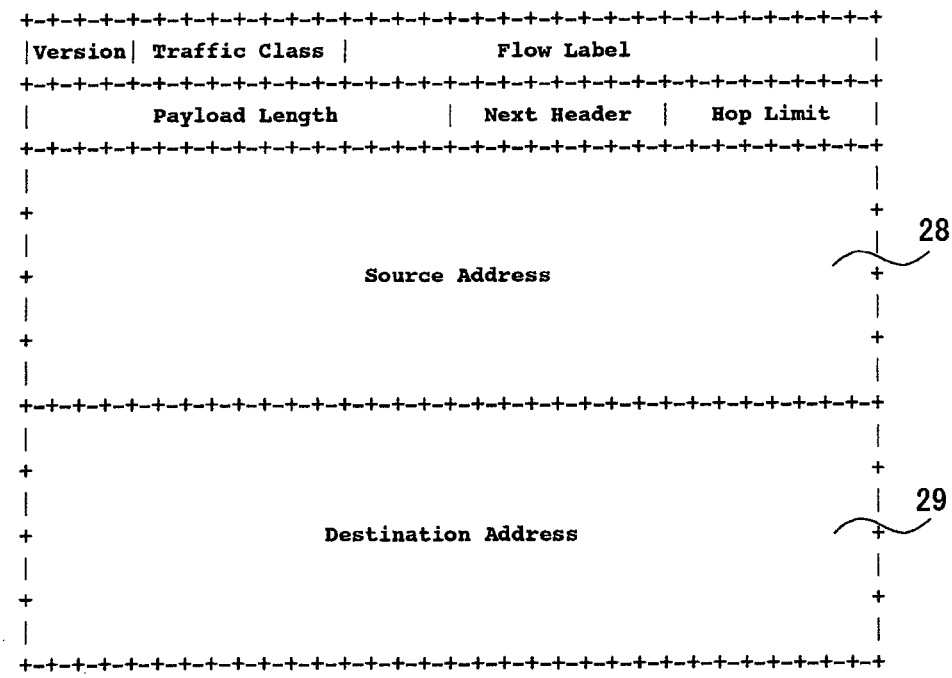
FIG. 3 shows an explanation drawing of an IPv6 header.
Figure 4:
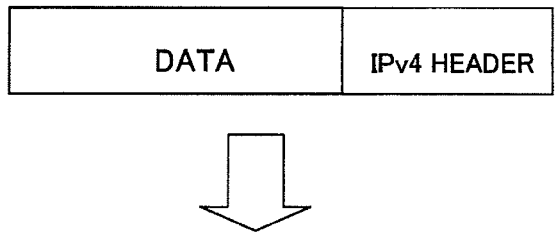
FIG. 4 shows a drawing illustrating header encapsulation.
Figure 4A:
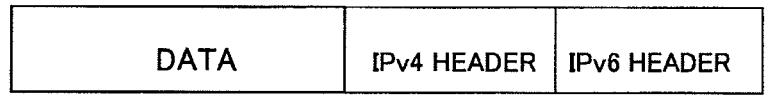
Figure 4B:
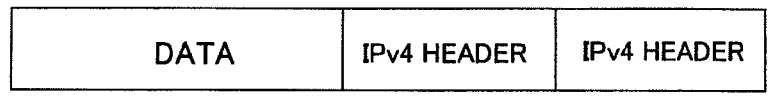
Figure 4C:
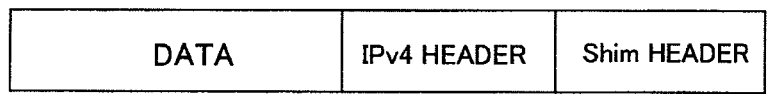
Figure 5:
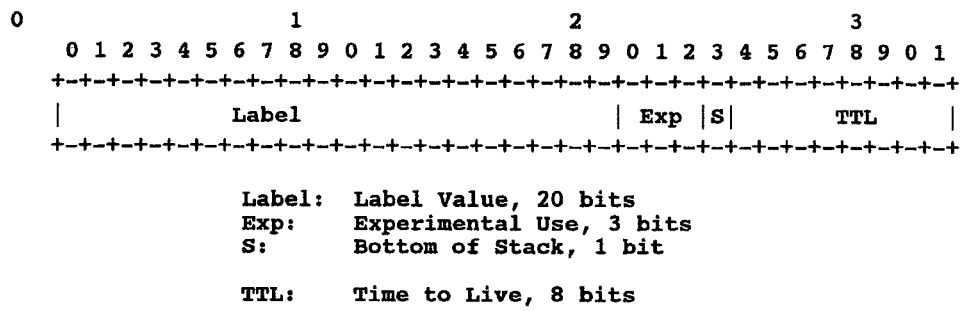
FIG. 5 shows a diagram illustrating an MPLS shim header.
Figure 6C:
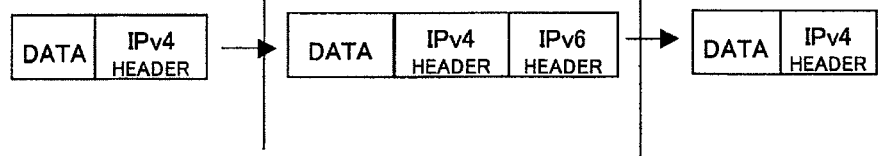
FIG. 6C shows an aspect of header conversion shown taking the header conversion shown in FIG. 4A.

This situation is shown in FIG. 6C, taking the header conversion shown in FIG. 4A as an example.

The foregoing description is based on the intranet employing IPv4. When IPv6 is employed in the intranet, a similar operation can be achieved by handling as an IPv4 address a subnet ID, or a data under a site prefix, included in a site-local address (i.e. a local address not connected to the Internet).

Figure 14:
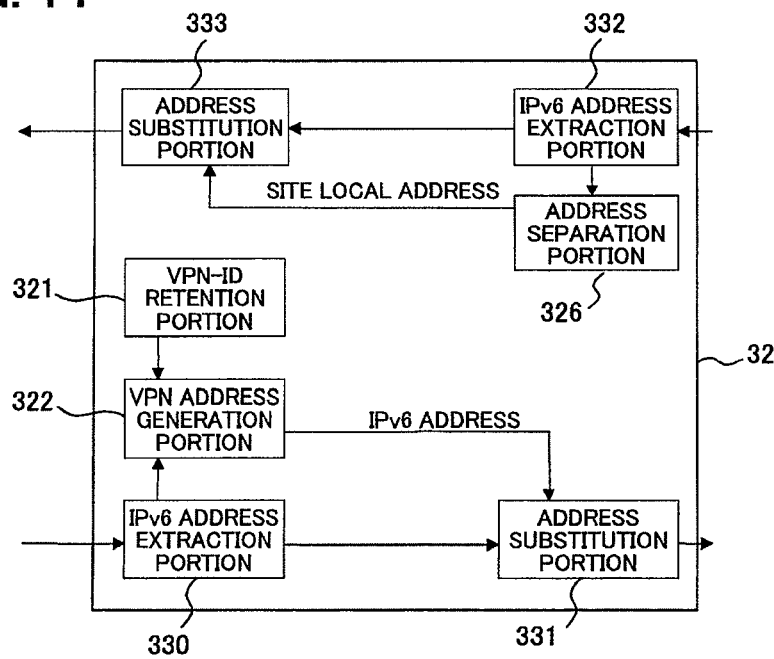
FIG. 14 shows an example of configuration of a VPN accommodation function portion shown in FIG. 8, illustrating an example of employing IPv6 in the intranet.
Figure 15:
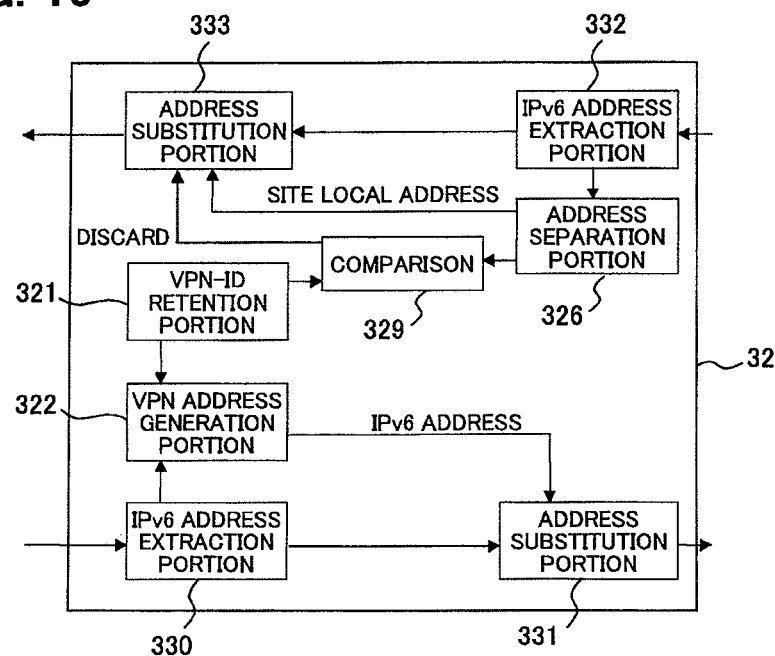
FIG. 15 shows another example of configuration of the VPN accommodation function portion shown in FIG. 8 in an example of employing IPv6 in the intranet.

FIGS. 14, 15 show examples of configuration block diagram of VPN accommodation function portion 32 when IPv6 is used in the intranet, which respectively correspond to FIGS. 9, 10. As shown in FIGS. 14, 15, IPv6 address extraction portions 330, 332 and address substitution portions 331, 333 are provided for handling IPv6 addresses.

Figure 16:
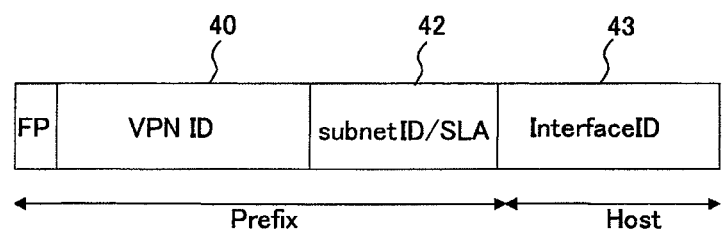
FIG. 16 shows a diagram illustrating a VPN address corresponding to the configurations shown in FIGS. 14, 15.

FIG. 16 shows an explanation drawing of a VPN address corresponding to the configurations shown in FIGS. 14, 15. In these FIGS. 14, 15, a VPN address is generated by the address conversion using a VPN-ID 40 shown in this FIG. 16, a subnet ID/SLA 42 in the site-local address format or the aggregatable global address format and an Interface ID field 43 in an IP header address used in an organization or among organizations.

This address conversion is performed in address substitution portion 331 shown in FIGS. 14, 15.

Figure 17:
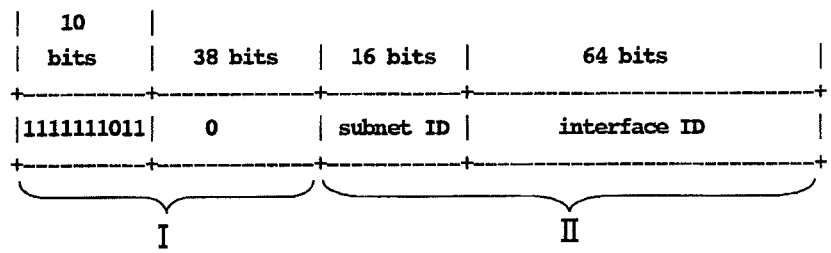
FIG. 17 shows a diagram illustrating an address used in a site-local address format.

Here, an exemplary address in the site-local address format is shown in FIG. 17. In this FIG. 17, field I denotes a global address, and field II denotes an address in an organization having a subnet ID and an interface ID.

Figure 18:
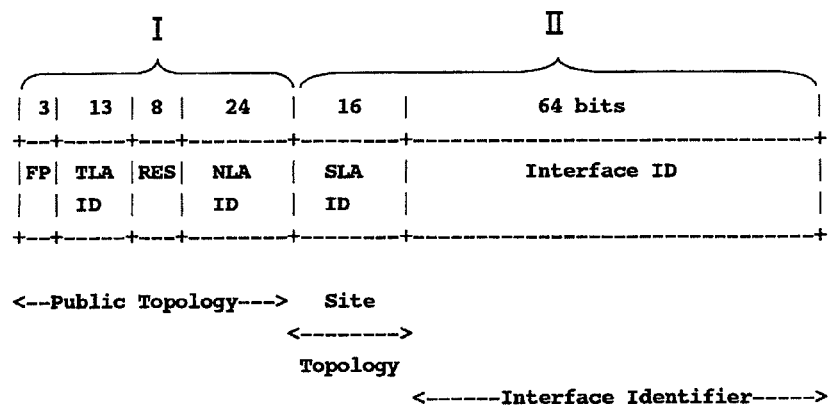
FIG. 18 shows an example of an aggregatable global address.

FIG. 18 shows an example of an aggregatable global address, in which field I includes global address, and field II includes Site-Level Aggregation ID and Interface ID.

Further, as an application of the present invention, it is possible to use VPN address shown in FIGS. 19A and 19B.

Here, FIG. 19A shows a case of employing IPv4 in the intranet, while FIG. 19B shows a case of employing IPv6 in the intranet.

In FIGS. 19A and 19B, there is provided a scope field 44 which stores a flag indicating whether or not VPN-ID 45 is a VPN closed in a service provider. In the case of closed VPN in the service provider, it becomes possible for the service provider to assign VPN-ID 45.

As another application of the present invention, a VPN address shown in FIGS. 20A and 20B may be used. FIG. 20A shows the case of IPv4 employed in the intranet, while FIG. 20B shows the case of IPv6 employed in the intranet.

FIGS. 20A and 20B shows an example that using an IPv4 global address as a VPN-ID inevitably results in obtaining a unique VPN-ID 45. For example, using an IPv4 global address assigned to an organization produces a unique address. At the same time, this makes it unnecessary to manage for maintaining VPN-ID 45 uniquely.

INDUSTRIAL APPLICABILITY

As having been described, according to the pre sent invention, a VPN service can be achieved with a remarkably reduced number of settings compared to other methods. This brings about less possibility of setting errors or operational mistake and therefore an operator may provide the service safely.

Because of the reduced number of settings against end user demands, the service may be provided in a short preparation period. In addition, according to the present invention, a simple functional addition in an edge router is only required. For routers on users' side and routers not located on user boundary, routers for general use may be used without need of modification, thus facilitating installation.

Further, when considering multi-vender connection using routers of multi-vender products, the method requires only a unicast routing protocol of general use having sufficient actual operation results, such as RIP, OSPF, IS-IS or BGP. Any peculiar protocol such as MPLS label distribution protocol is not necessary. Therefore, multi-vender connection may be achieved easily.

Moreover, the service may be introduced even when addresses assigned in an organization is overlapped.

To conclude, the present invention brings about a large effect, greatly contributing for the expansion of VPN services on the Internet.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A method of communication between first and second networks providing a virtual private network (VPN) through the Internet, the first and second networks are in compliance with IP version 4 and the Internet is in compliance with IP version 6, the method comprising the steps of:

receiving a first IP packet including a first IP address from the first network which is in compliance with IP version 4, retaining a VPN number identifying the VPN;

converting the first IP address of the first IP packet under IP version 4 into a second IP address of a second IP packet under IP version 6 by combining the VPN number identifying the VPN with said first IP address, transferring the second IP packet into the Internet, which is in compliance with IP version 6, receiving the second IP packet including the second IP address from the Internet which is in compliance with IP version 6, separating the first IP address from the VPN number identifying the VPN from the received second IP packet;

converting the second IP address of the second IP packet under IP version 6 into the first IP address of the first IP packet under IP version 4 by extracting the first IP address, and replacing the second IP address with the first IP address comparing the retained VPN number with the separated VPN number to discard the received second IP packet if the compared VPN numbers are different; and transferring the first IP packet with the converted IP address in the first network which is in compliance with IP version 4, wherein the second IP address under IP version 6 includes the first IP address under IP version 4 and the VPN number identifying said VPN, wherein the VPN number is uniquely assigned in a region, wherein the region is a region of an internet service provider on the internet, and wherein the VPN number comprises a format prefix for distinguishing the second IP address from address of other type.

2. An apparatus of communication between first and second networks providing a virtual private network (VPN) through the Internet, the first and second networks are in compliance with IP version 4 and the Internet is in compliance with IP version 6, comprising:

first receiving means for receiving a first IP packet including a first IP address from the first network which is in compliance with IP version 4, means for retaining a VPN number identifying the VPN;

means for converting the first IP address of the first IP packet under IP version 4 into a second IP address of a second IP packet under IP version 6 by combining the VPN number identifying the VPN with said first IP address, means for transferring the second IP packet in the Internet, which is in compliance with IP version 6, second receiving means for receiving the second IP packet including the second IP address from the Internet which is in compliance with IP version 6, means for separating the first IP address from the VPN number identifying the VPN from the second IP packet;

means for converting the second IP address of the second IP packet under IP version 6 into the first IP address of the first IP packet under IP version 4 by extracting the first IP address, and replacing the second IP address with the first IP address;

means for comparing the VPN number retained by the retaining means with the separated VPN number to discard the received second IP packet if the compared VPN numbers are different; and means for transferring the first IP packet with the converted IP address in the second first network which is in compliance with IP version 4, wherein the second IP address under IP version 6 includes the first IP address under IP version 4 and the VPN number identifying said VPN, wherein the VPN number is uniquely assigned in a region, wherein the region is a region of an internet service provider on the internet, and wherein the VPN number comprises a format prefix for distinguishing the second IP address from address of other type.

* * * * *